United States Patent [19]

Huss

[11] 4,310,112
[45] Jan. 12, 1982

[54] APPARATUS AND METHOD FOR REMOVAL OF FLASH FROM CONTAINERS

[75] Inventor: Jerry L. Huss, Tecumseh, Mich.

[73] Assignee: Hoover Universal, Inc., Saline, Mich.

[21] Appl. No.: 166,242

[22] Filed: Jul. 7, 1980

[51] Int. Cl.³ .............................................. B26F 3/02
[52] U.S. Cl. ......................................... 225/3; 83/914;
225/99; 225/106; 425/806
[58] Field of Search ....................... 225/1, 98, 99, 100,
225/101, 106; 425/806 R, 806 A; 83/914

[56] References Cited

U.S. PATENT DOCUMENTS

| | | | |
|---|---|---|---|
| 3,040,376 | 6/1962 | Elphee | 225/99 X |
| 3,098,593 | 7/1963 | Heider | 225/99 X |
| 3,172,152 | 3/1965 | Uhlig | 425/806 |
| 3,677,454 | 7/1972 | Boyer | 225/99 |
| 4,096,981 | 6/1978 | Martorano | 225/99 |

Primary Examiner—Frank T. Yost
Attorney, Agent, or Firm—Olsen and Stephenson

[57] ABSTRACT

Apparatus for separating pendent tail scrap from the bottoms of containers advanced continuously in series by exerting a tensile force between each advancing container and the pendent tail. Each container is advanced with its pendent tail extending through a slot in a conveyor, and counter rotation rollers grip and pull the tail to cause the separation. A method of operation includes advancing a series of containers and progressively gripping the flash of each advancing container from the leading edge to the trailing edge thereof, and pulling the flash simultaneously as the gripping occurs to cause separation of the flash from the leading to the trailing edge thereof by exertion of tensile force applied between the tail and the bottom of the container.

9 Claims, 5 Drawing Figures

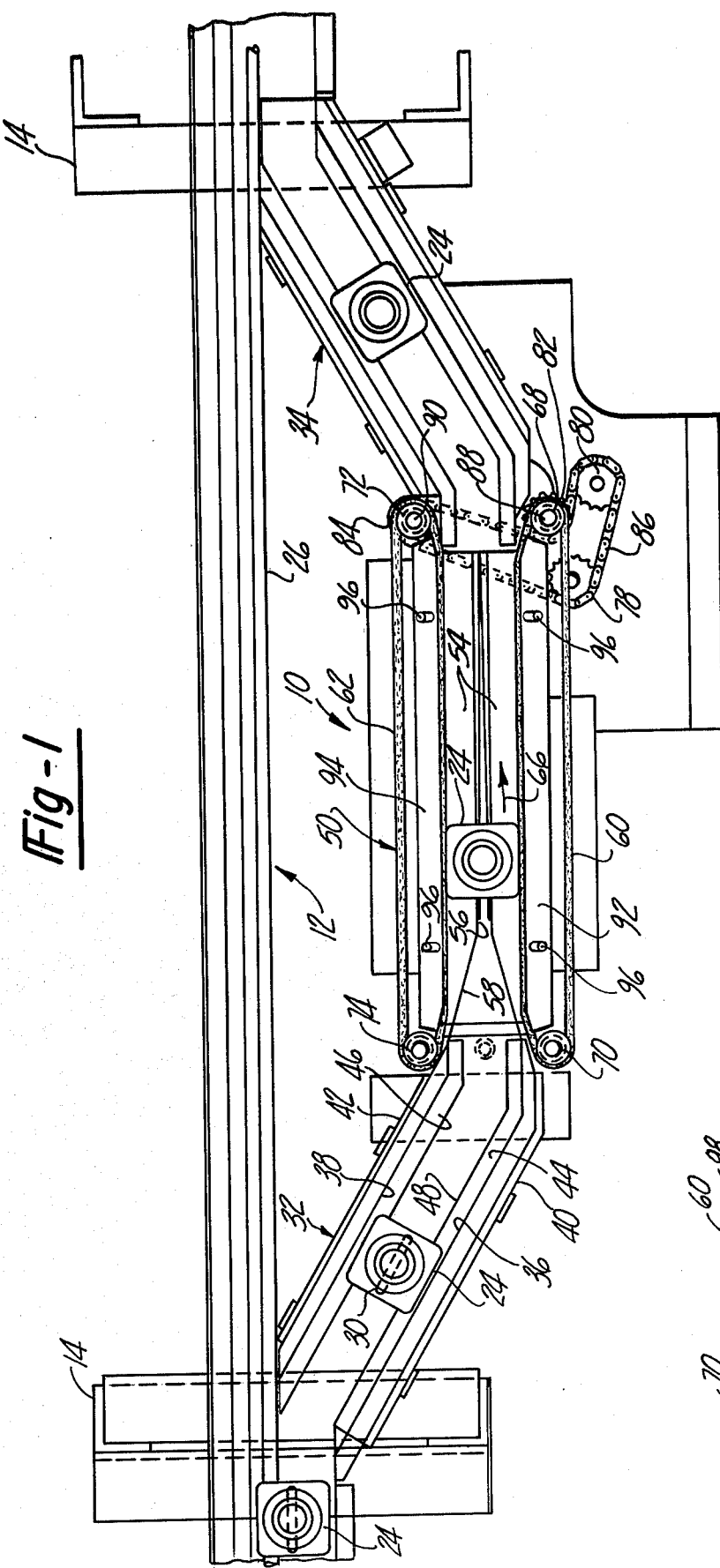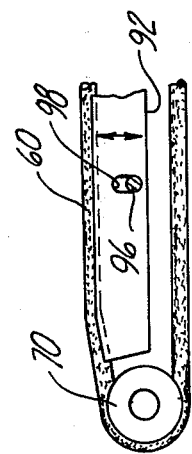

4,310,112

APPARATUS AND METHOD FOR REMOVAL OF FLASH FROM CONTAINERS

TECHNICAL FIELD

The present invention relates to apparatus for removing pendent flash from the bottoms of containers blow molded from thermoplastic material and to a method of removing the flash.

BACKGROUND OF THE INVENTION

It is known in the art to separate the tail or flash from the bottom of a container that has been formed by a blow molding operation by exerting a tensile force between the container and the flash to cause a separation thereof. Apparatus for carrying out such an operation is disclosed, for example, in U.S. Pat. No. 3,677,454, patented July 18, 1972 in the name of Boyer. As disclosed in this patent, the flash is grasped between two moving chains and the tensile force necessary for severing the flash from the container is provided by moving the chains to which the flash is attached so that the container is forced to travel up an inclined plane away from the chains while the flash continues to travel in a linear course with the chains.

It is also known to provide flash trimming apparatus wherein the containers are grasped by a pair of side gripper belts and are transported on a conveyor, and the flash is then torn away by a pair of endless chains that grasp the flash as the containers are transported. The chains accomplish this result by laterally twisting the flash from the path of travel of the containers. Apparatus of this type is disclosed in U.S. Pat. No. 3,098,593, patented July 23, 1963 in the name of Heider.

Other known forms of apparatus for trimming flash from blown containers are disclosed in the following U.S. Pat. Nos.:

3,464,084—Sept. 2, 1969—Thompson;
3,172,152—Mar. 9, 1965—Uhlig;
3,040,376—June 26, 1962—Elphee.

There remains a need for improvements over the prior art in the trimming of flash from containers. In particular, a need exists for improved apparatus which will allow the containers to be advanced continuously by a conveyor system in upright positions to the trimming station, at which the containers are trimmed more expeditiously and returned to the conveyor system in the same upright positions without slowing down the flow of containers and without upsetting any of them so as to interfere with either the trimming or the subsequent operations that are to be performed in connection with the containers.

SUMMARY OF THE INVENTION

According to one form of the present invention, apparatus for removal of flash from containers is provided comprising a conveyor on which the containers can be advanced continuously in series, and a deflashing mechanism associated therewith that exerts a tensile force between each container and its flash to cause separation thereof as the containers are advanced on the conveyor. The conveyor has a container guide plate or means on the upper side of which the containers advance, said guide plate or means having a longitudinal slot through which the flash or tail of each advancing container extends to the lower side thereof. The deflashing mechanism includes elongated counter rotation rollers located adjacent to said slot and extending longitudinally thereof on the lower side of the guide plate or means for gripping and pulling the extending flash of each advancing container between the rollers. Roller drive means are operatively connected to the rollers for counter rotating them as the containers are advanced. Thus, the guide means supports the containers on the upper side of the guide means while the counter rotation rollers grip and pull the dependent tails or flash extending below the guide means to exert the necessary tensile force between each container and its flash to cause the desired separation.

In a preferred form of the invention, the counter rotation rollers are in spaced apart relation and have axes of rotation that converge in the direction of advancement of the containers. By virtue of this arrangement, the counter rotation rollers will function somewhere along their lengths to grip the flash irrespective of the thickness of the flash that may result from the blow molding operation. Also, various gripping surfaces may be provided on the rollers, suitable knurled surfaces being preferred for this purpose.

The containers can be pushed through the trimming station, one against the next, but preferably they will be guided by the guide means and simultaneously will be advanced by drive belts that engage opposite sides of the containers and advance the containers at the same rate as the conveyor system from which they were delivered. The belts serve to advance the containers continuously at the desired rate and also serve as supports to avoid inadvertent upsetting of the containers during the advancing and trimming operations.

Another feature of the present invention that is utilized in a preferred form of the invention is the belt guide members that are provided in association with the belts for assuring firm engagement of the containers by the drive belts for the full length of the deflashing station. These guide members are also preferably adjustable so that the apparatus can be used for trimming containers of various sizes, merely by selectively adjusting the spacing between the guide members and thereby the spacing between the drive belts.

Suitable drive belt means are provided, and for this purpose it is preferred that the speed at which the drive belts travel can be selectively varied so that the trimming operations can be set to operate at essentially the same rate as the conveyor system with which the trimming system is associated. Thus, any conventional electric motor can be employed and the speed of the drive system can be selectively varied, such as by altering the sizes of drive sprockets, or the like. Similarly, variable speed electric motors can be employed.

Thus, in a preferred method of operation, the plastic containers are advanced continuously in series in upright positions along a preselected horizontal path with the flash in alignment with the path of travel, and the flash of each advancing container is progressively gripped from the leading to the trailing edge thereof and the flash is pulled downwardly simultaneously as the gripping occurs to cause separation of the flash from the leading to the trailing edge thereof by exertion of tensile force applied between the flash and the bottom of the container.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a top plan view of apparatus embodying the present invention;

FIG. 2 is an enlarged fragmentary detail, partly in section, showing a portion of the belt guide member;

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 3:
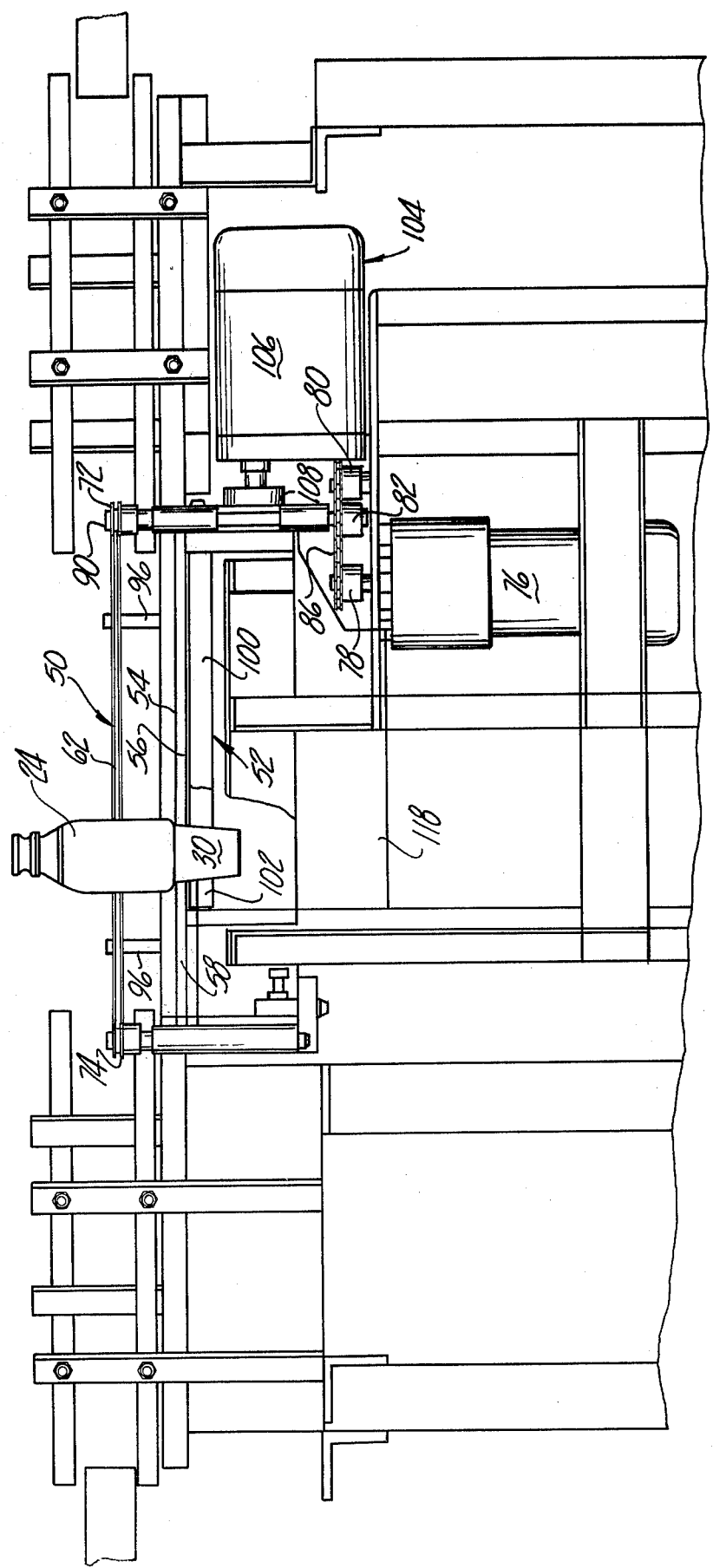
FIG. 3 is a fragmentary front elevational view with portions broken away for illustration purposes of the apparatus of FIG. 1.
Figure 4:
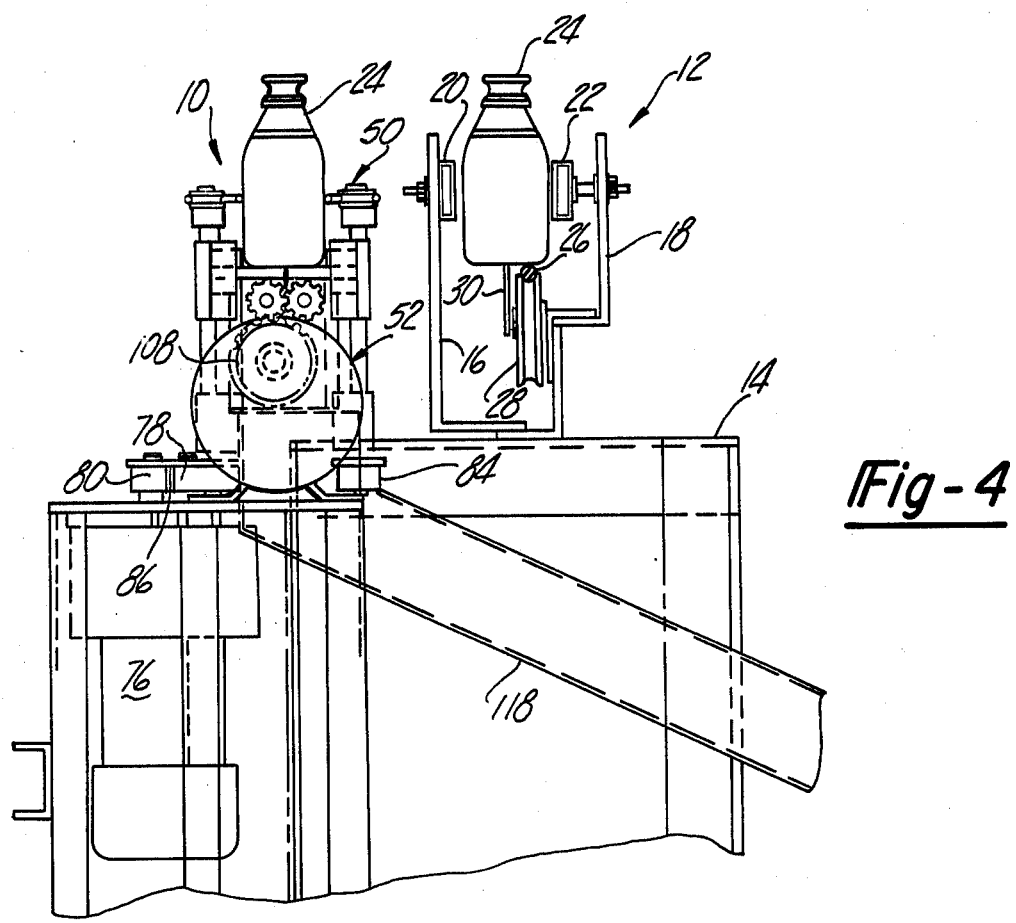
FIG. 4 is a fragmentary end elevational view of the apparatus of FIG. 1.

Referring now to the drawings, the invention will be described in greater detail. The apparatus 10 for the removal of flash from containers formed of thermoplastic material is adapted to be used in conjunction with a conventional cable conveyor 12 that includes a frame 14, side plates 16 and 18 mounted on the frame 14, guide rails 20 and 22 supported on the side plates 16 and 18 for guiding a plurality of bottles 24 adapted to travel on the table or belt 26 that is driven on the plurality of idler wheels 28. The cable conveyor 12 normally is located so that the centerline thereof coincides with the centerline of the die head of the blow molding machine in which the series of bottles 24 are formed and from which they are discharged. As seen in FIG. 4, the bottle 24 has a pendent tail or flash 30 depending from its bottle wall, the flash 30 being typical of that which is conventional when blow molding plastic bottles from organic plastic materials. As indicated, the cable conveyor 12 is conventional apparatus and further description is unnecessary.

The apparatus 10 is constructed and arranged to be positioned in parallel relationship adjacent to the cable conveyor 12 in the position that is seen in FIG. 1 wherein an inlet conveyor 32 is arranged to receive the containers 24 as they are advanced from the blow molding machinery (not shown). It will be observed that the containers 24 are in spaced apart relationship as illustrated in the drawings, but it is to be understood that normally the containers will be in abutting relationship, but they are shown spaced apart to permit better illustration of the apparatus.

The outlet conveyor 34, which is constructed similarly to the inlet conveyor 32 is provided at the discharge end of the apparatus 10 to permit the return of the containers 24, after they have been trimmed, to the cable conveyor 12. Details of construction of the inlet conveyor 32 and the outlet conveyor 34 are not a part of the present invention. Briefly, the inlet conveyor 32 includes the inlet side rails 36 and 38, the inlet side plates 40 and 42 and the inlet base plates 44 and 46. The inlet base plates 44 and 46 are spaced apart in parallel relationship to provide a slot 48 into which the flash or tail 30 can extend, and the rest of the container can slide freely on the base plates 44 and 46. The inlet guide rails 36 and 38 will be adjustably fitted with respect to the side plates 40 and 42 so that the space between them will accommodate the containers 24. The outlet conveyor 34 is similarly constructed, and therefore, further description of this conveyor is unnecessary.

The apparatus 10 comprises the conveyor 50 on which the containers 24 can be advanced continuously in series, and a deflashing mechanism 52 that cooperates with the conveyor 50 to exert a tensile force between each container 24 and its flash 30 to cause a separation thereof as the containers 24 are advanced on the conveyor 50.

The conveyor 50 includes a container guide means 54 in the form of a pair of flat plates that are mounted in spaced apart relationship to provide a slot 56 therebetween in which the dependent flash 30 of each advancing container 24 can extend. The inlet end of the guide means 54 has a throat 58 which converges inwardly to the slot 56 for guiding the flash 30 into the slot 56. The conveyor 50 also includes a pair of drive belts 60 and 62 which travel in parallel spaced-apart relationship above the slot 56 for engagement with the opposite sides of each advancing container 24 for moving each advancing container 24 in the direction of the arrow 66, FIG. 1.

The drive belt 60 is fitted on the grooved pulleys 68 and 70, the former being the drive pulley and the latter being the idler pulley. Similarly, the drive belt 62 is mounted on the grooved pulleys 72 and 74, the former being the drive pulley and the latter being the idler pulley. An electric drive motor 76 is provided for driving the sprocket 78, which is connected to the idler sprockets 80, 82 and 84 by the sprocket chain 86 for driving the drive pulleys 68 and 70. Each of the drive pulleys 68 and 70 is connected respectively to a sprocket 82 or 84 by means of the shafts 88 and 90 so as to rotate at uniformly the same speeds. Thus, the speed at which the motor 76 rotates will govern the speed of the belts 60 and 62. For the purpose of altering the speed of the belts 60 and 62 the sprockets 78 and 80 can be selectively varied in size by interchanging them with other sprockets of different radii. Also, the electric motor 76 can be a variable speed motor for selectively adjusting the speed at which the belts 60 and 62 are driven.

The spacing between the belts 60 and 62 can be selectively varied so as to accommodate advancing containers of different dimensions than those of the containers 24. The conveyor 50 includes the belt guide members 92 and 94 which have grooves in their facing surfaces in which the belts 92 and 94 travel. The guide members 92 and 94 are mounted on a plurality of stilts 96, and as can be seen best in FIG. 2, the guide members have slots 98 therein through which the stilts 96 extend to allow lateral adjustment of the belt guide members in the direction of the arrow 98 relative to the paths of movement of the belts. This feature allows the conveyor 50 to be used in conjunction with containers of different widths. It also allows the guide members 92 and 94 to be adjusted so that they remain in close proximity to the containers 24 that advance therethrough and so that they guide the belts 60 and 62 in a manner to assure that the latter continued to maintain driving contact with the sides of the containers as they advance through the apparatus 10.

Figure 5:
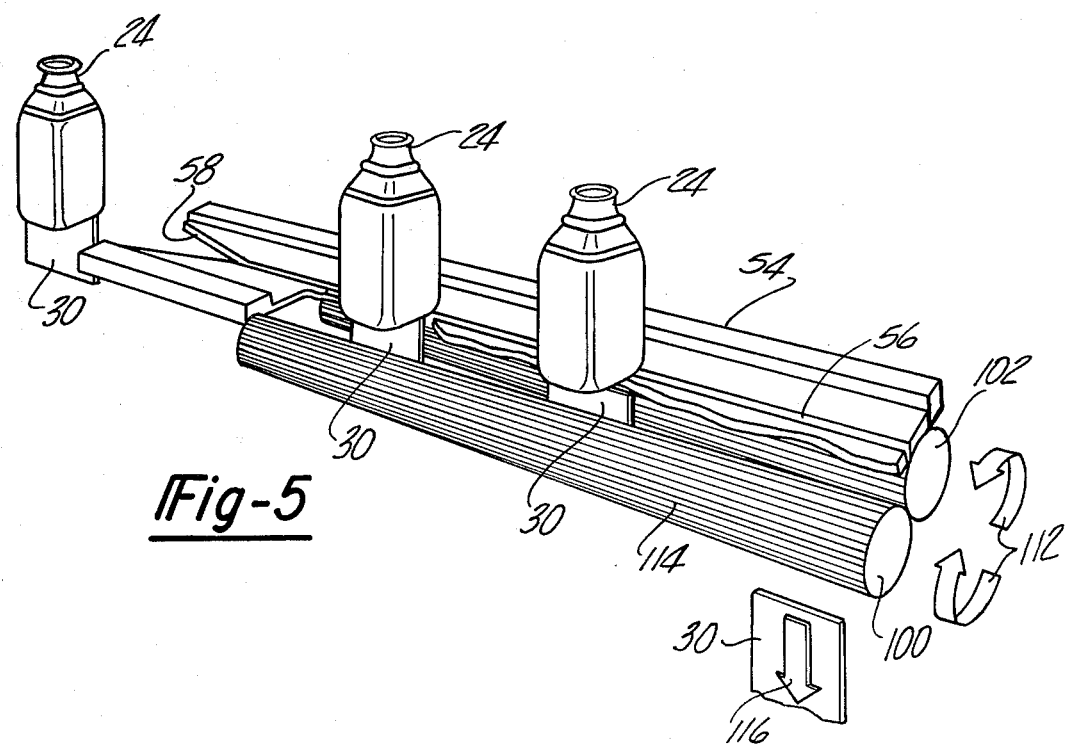
FIG. 5 is a schematic view in perspective showing components of the conveyor and deflashing mechanisms of the apparatus of FIG. 1.

The deflashing mechanism 52 includes the elongated counter rotation rollers 100 and 102 located adjacent to the slot 56 and extending longitudinally thereof on the lower side of the container guide means 54 for gripping and pulling the extending flash 30 from each advancing container 24 downwardly in between the rollers 100 and 102. Roller drive means 104 is provided which includes the electric motor 106, a drive spur gear 108 which is driven by the electric motor 106, and driven spur gears 110 and 112 which are drivingly affixed to the rollers 100 and 102 and are in driving relationship to the spur gear 108. Thus, when the motor 104 is rotating, the counter rotation rollers 100 and 102 will operate to rotate in the direction of the arrows 112, FIG. 5.

The counter rotation rollers 100 and 102 are in spaced apart relationship and have axes of rotation that converge in the direction of advancement of the containers 24. As the containers move along the upper side of the guide means 54 the flash 30 will initially move freely between the counter rotation rollers 100 and 102, but as they advance, they will be engaged at their leading edge and then will be quickly gripped and pulled between the rollers causing separation of the flash from the container by the tensile force that is exerted. The tensile force will initially occur at the leading edge, and the flash will then be torn from the leading edge to the trailing edge from the bottom wall of the container 24. The counter rotation rollers 100 and 102 normally will have knurled circumferential surfaces as indicated at 114 to aid in gripping the flash 30. Not only does the converging arrangement of the rollers aid in initiating the tearing of the flash from the front to the rear edge of the flange 30, but it also allows the deflashing mechanism to be utilized with containers that have flash of irregular thickness, because the flash can be engaged anywhere along the length of the counter rotation rollers 100 and 102 and the flash will be effectively removed. The flash will normally be discharged in the downward direction as indicated by the arrow 116, FIG. 5. Forming a part of the apparatus 10 is the chute 118 which receives the scrap and which extends along the full length of the rollers to accommodate all of the scrap that may be discharged from the rollers 100 and 102.

Thus, it can be seen that an improved method has been provided for removing flash from bottoms of plastic containers that are advancing continuously in series in upright positions along a preselected horizontal path with the flash being maintained in alignment with the path of travel. As seen in the schematic illustration, FIG. 5, as the flash of each advancing container is progressively gripped from the leading to the trailing edge thereof the flash is pulled downwardly simultaneously as the gripping occurs, to cause separation of the flash from the leading to the trailing edge thereof by exertion of tensile force applied between the flash and the bottoms of the container. The containers can move continuously in their upright positions and the deflashing occurs in a manner so as not to upset the containers and to allow them to be returned at a rapid rate to the conveyor 12 for further handling or use of the containers 24.

It is claimed:

1. Apparatus for removal of flash from containers formed of thermoplastic material following blow molding thereof, comprising a conveyor on which the containers can be advanced continuously in series, and a deflashing mechanism that exerts a tensile force between each container and its flash to cause a separation thereof as the containers are advanced on the conveyor, characterized in that said conveyor has a container guide means on one side of which said containers advance, said guide means having a slot through which the flash of each advancing container extends to the other side of the guide means, said deflashing mechanism includes elongated counter rotation rollers located adjacent to said slot and extend longitudinally thereof on said other side of the guide means for gripping and pulling the extending flash of each advancing container between the rollers, and roller drive means are operatively connected for counter rotating said rollers as said containers are advanced, said guide means and said counter rotation rollers thereby cooperating to exert said tensile force between each container and its flash.

2. Apparatus for removal of flash from containers according to claim 1, characterized in that said counter rotation rollers are in spaced apart relation and having axes of rotation that converge in the direction of advancement of the containers.

3. Apparatus for removal of flash from containers according to claim 2, characterized in that said counter rotation rollers have knurled circumferential surfaces.

4. Apparatus for removal of flash from containers according to claim 1, characterized in that said conveyor includes drive belts that extend in parallel relation above and on opposite sides of said slot for engagement of opposite sides of containers to advance them along said guide means, and belt drive means are connected to said belts for driving the belts.

5. Apparatus for removal of flash from containers according to claim 4, characterized in that belt guide members are mounted in positions to extend adjacent to said belts for guiding the belts so that they maintain driving engagement with the advancing containers.

6. Apparatus for removal of flash from containers according to claim 5, characterized in that said belt guide members are mounted for lateral adjustment relative to the paths of movement of the belts so that the spacing between the parallel drive belts can be selectively varied for accommodation of containers of different dimensions.

7. Apparatus for removal of flash from containers according to claim 4, characterized in that said belt drive means are selectively adjustable for varying the speed at which said belts are driven.

8. Apparatus for removal of flash from containers according to claim 4, characterized in that said deflashing mechanism includes a scrap chute located under said elongated counter rotation rollers and extending the lengths thereof to receive flash pulled by said rollers from said containers.

9. A method of removing pendent flash from the bottoms of plastic containers that are advancing continuously in series in upright positions along a preselected horizontal path with the flash in alignment with the path of travel, characterized in that the flash of each advancing container is progressively gripped from the leading to the trailing edge thereof and the flash is pulled downwardly simultaneously as the gripping occurs to cause separation of the flash from the leading to the trailing edge thereof by exertion of tensile force applied between the flash and the bottom of the container.

* * * * *